May 5, 1931.                    W. F. PALMER                    1,804,271
                              TORCH CUTTING DEVICE
                         Filed July 8, 1930        2 Sheets-Sheet 2
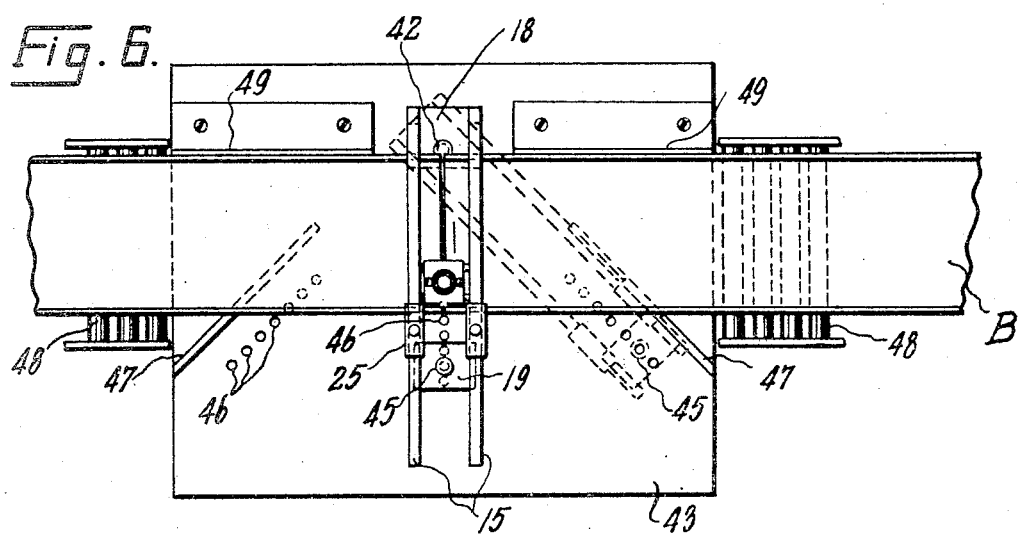
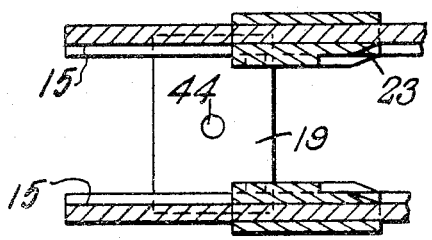
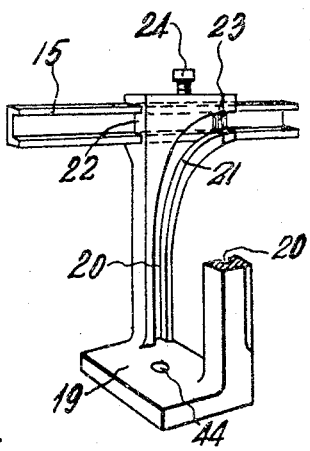
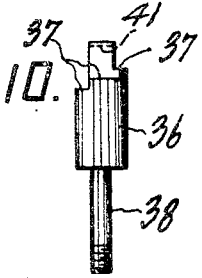
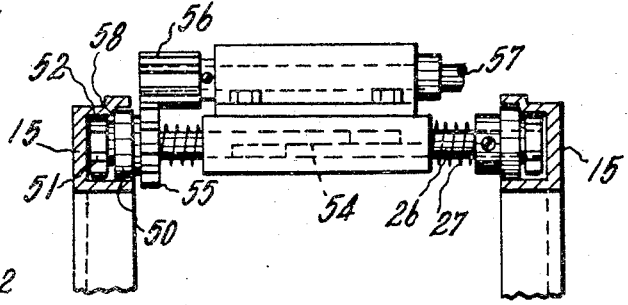
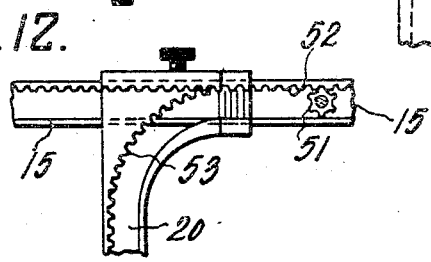
INVENTOR.
WAYNE F. PALMER
BY
ATTORNEYS.

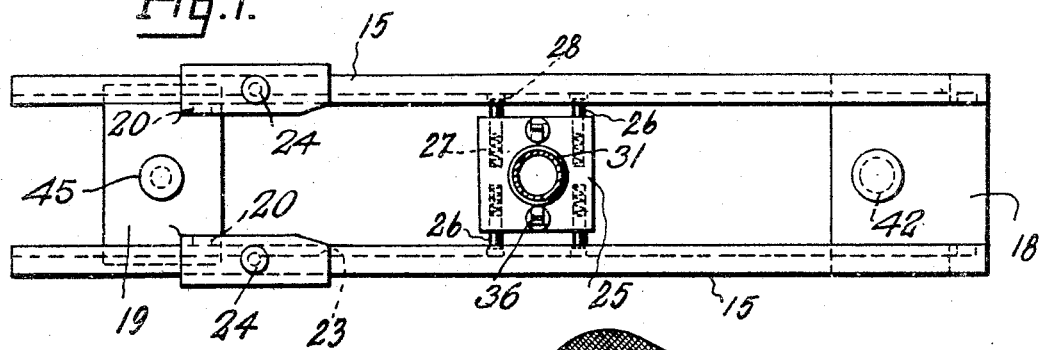
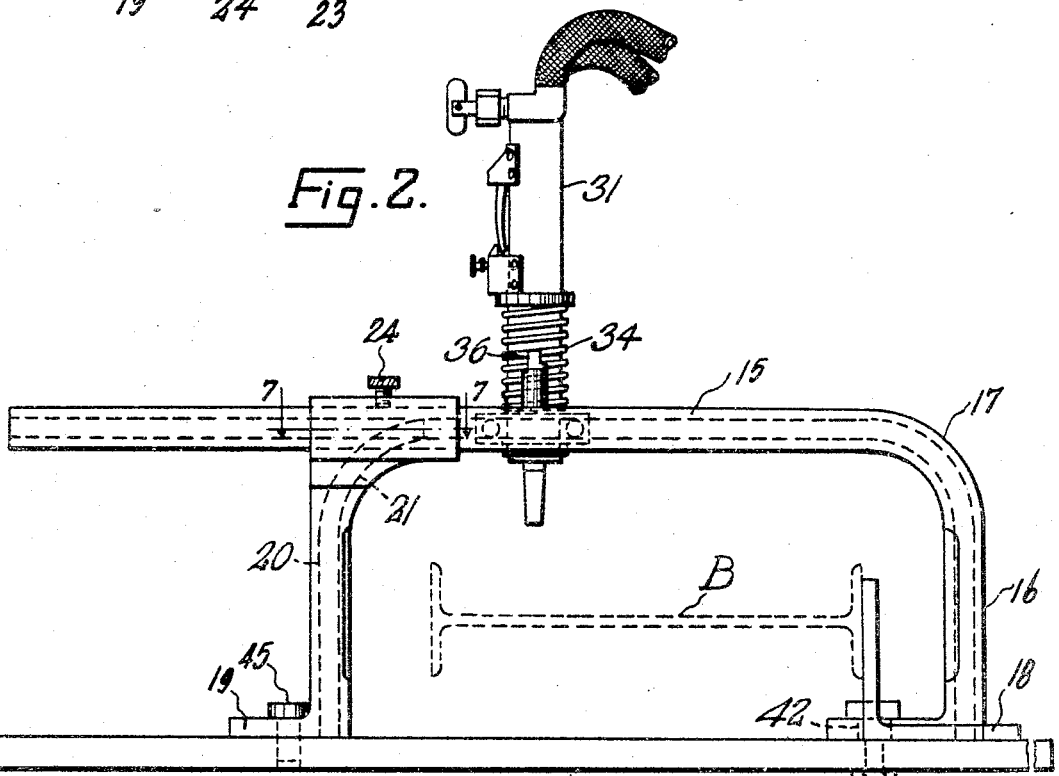
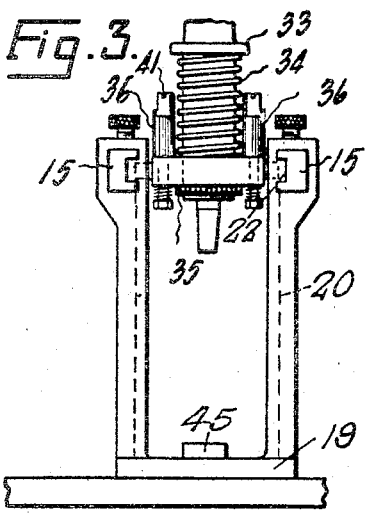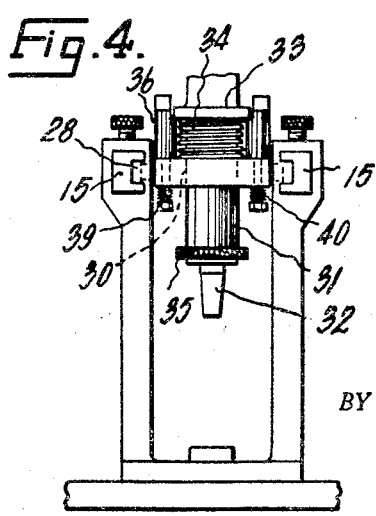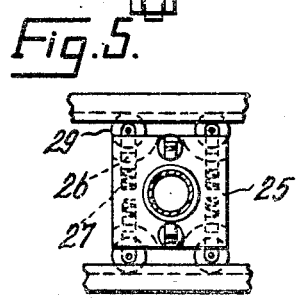
INVENTOR.
WAYNE F. PALMER
ATTORNEYS.

Patented May 5, 1931

1,804,271

UNITED STATES PATENT OFFICE

WAYNE F. PALMER, OF HOLYOKE, MASSACHUSETTS

TORCH CUTTING DEVICE

Application filed July 8, 1930. Serial No. 466,471.

This invention relates to devices for cutting metal, especially structural steel shapes, by means of an oxyacetylene or other torch.

One object of the invention is to provide a device of this general character in which the torch will be accurately guided with the point of the torch in predetermined relation with the surface of the metal to be cut, irrespective of the re-entrant form of the structural shapes, such for example as I-beams. A further object is to provide a device of this character which is sufficiently simple so that it may be adapted either to manual or to power propulsion of the torch. A further object is to provide a device of this character which is adjustable to take any of the standard sizes of I-beams or other structural shapes within a predetermined range and to provide this adjustment both for variations in the depth of the beam in the direction of its web and for variations in the width of flange occurring in I-beams of different sizes.

The invention will now be described with reference to the accompanying drawings, in which:

Fig. 1 is a top plan view of a trackway and torch guiding carriage constructed in accordance with my invention;

Fig. 2 is a side elevation thereof;

Fig. 3 is an end elevation of certain parts shown in Fig. 2;

Fig. 4 is a similar view showing the parts in a different position;

Fig. 5 is a detail corresponding to a part of Fig. 1 but showing a modified form of torch carriage;

Fig. 6 is a top plan view illustrating the adaptation of this device for cutting I-beams;

Fig. 7 is a sectional plan taken substantially on line 7—7 of Fig. 2;

Fig. 8 is a perspective view, partly broken away, showing a construction which permits the length of track to be adjusted transversely of the I-beam to be cut;

Figs. 9 and 10 are respectively top plan and side elevational views of a stop device for limiting the vertical travel of the torch in accordance with the size of I-beam being operated on;

Fig. 11 is a sectional elevation showing a modified form of carriage; and

Fig. 12 is a side elevation of a portion of the trackway adapted for coaction with the carriage shown in Fig. 11.

The device consists of a trackway extending over the I-beam to be cut and adjustable in length to accommodate various sizes of I-beams, a carriage running in this trackway and a torch mounted in the carriage and capable of movement therein so that it may be projected toward the re-entrant portions of the I-beam. The trackway is composed of a pair of main channel members 15 having portions 16 extending at substantially right angles and joined to the main trackway portion by a smooth curve 17. The angular portion 16 of each track is secured to a base 18 serving the double purpose of holding the tracks in spaced relation and of anchoring them to the frame of the machine as will be described later. A second base 19 holds a pair of channel tracks 20 which are generally similar to the angular portions 16 of the main tracks and have curved portions 21 joining them to the main channel members 15. Each of the channel tracks 20 is provided with a tongue 22 fitting within the corresponding main channel section, as best shown in Fig. 8, and beveled off as at 23 so that a smooth incline is presented from the bottom of the main channel to the bottom of the channel in the curved portion 21. The channel tracks 20 can be secured in any desired position along the main channel by set screws 24 or any similar devices. It will be seen that the composite channel thus formed is continuous, but that the channel sections 20 are somewhat closer together than the channel sections 15.

Running in these channel tracks is a carriage 25 having shafts 26, four in number as shown, extending toward the channels and pressed outwardly by springs 27 mounted within recesses in the carriage. At the channel ends of these shafts may be mounted antifriction rolls of the type shown at 28 in Fig. 1 or at 29 in Fig. 5. This carriage will of course traverse the main section 15 and the curved and angular portions 16 and 17 of the same tracks without difficulty. When the carriage reaches the channel tracks 20, however, the rolls ride up on the beveled portions 23, thereby compressing the springs 27. The effect then is the same as shortening the shafts 26 upon which the rolls are mounted so that the carriage is permitted to travel along the channel sections 20 which are spaced together more closely than are the main trackways. This will be true whatever the longitudinal adjustment of the base 19 carrying the channel sections 20 with respect to the main trackways, the device affording a simple way of varying the length of travel of the carriage in accordance with the size of work to be operated upon.

The carriage is provided with a central hole 30 receiving the barrel 31 of an oxy-acetylene torch 32. Above the carriage the torch is provided with a flange 33 between which and the carriage is located a compression spring 34. This spring normally holds the torch elevated, as shown in Fig. 3, the limit of upward motion being determined by a collar 35 secured to the lower end of the torch barrel. The lower limit of movement is determined by a pair of studs or abutments 36 having their sides cut away to form stepped shoulders 37, as best shown in Figs. 9 and 10. The shank 38 of each stud passes through the carriage and has secured to it a nut 39 between which and the bottom of the carriage is mounted a compression spring 40. This spring serves to hold the stud in whatever adjusted position may be desired. A screw driver slot 41 in the upper end of each stud permits it to be rotated at will.

The purpose of the construction just described can best be shown in connection with Fig. 2 of the drawings. The torch may be started at either side of the I-beam B, this beam being positioned so that the torch will be spaced from it a distance which has been found best for cutting purposes, generally about one-fourth or three-eighths of an inch. As the carriage is raised along the angular portion 16 the end of the torch moves parallel to the base of the I-beam flange. The carriage is then swung through the curved portion 17 of the track into the main horizontal run of the track 15. As soon as the torch has cleared the base of the I-beam, it is pressed down against the stops 36, the proper shoulder 37 of the stud having been turned to engage the flange 33. During the travel of the torch across the web of the I-beam, it is kept depressed. On reaching the other base portion the torch is permitted to rise under the influence of the spring 34 and at about the same time the carriage rides onto the adjustable portion of its track. The curved portion 21 of this track turns the carriage through a right angle and further movement of the carriage causes the torch to pass along the remaining portion of the I-beam, shown in the drawings as being vertical.

For convenience in securing accurate work, the trackway is preferably adjustably mounted upon a bed-plate having conveying and guiding devices for the I-beam. This construction has been shown in Fig. 6. The base 18 is provided with a pivot 42 joining it to the base plate and permitting the whole trackway to be swung into any desired angular relation. Generally it will be sufficient to provide for cutting an I-beam at right angles or at an angle of 45°, and for this purpose I have shown selective adjusting devices which enable the trackway to be placed and maintained readily in either of these positions instead of employing an adjustment enabling any angular position to be assumed. It is of course possible, in case it should prove practically desirable, to adjust the angle of the trackway to any intermediate position. To hold the trackway in the desired angular relation on its pivot 42, the base 19 is provided with a hole 44 through which projects a stud or dowel 45 passing into one of a series of holes 46 in the base plate. It will be seen in Fig. 6 that one series of holes is provided where a 90° cut is to be made and two other series are provided along 45° lines permitting the torch to be given a slanting travel in either direction. Stop members 47 may be employed to assist in the quick adjustment of the base 19 to either extreme angular position. At either end of the bed-plate 43 a roller conveyer 48 has been provided for the I-beams, these being positioned relative to the cutting apparatus by fixed abutments 49.

As thus far described, the carriage bearing the torch is carried along the trackway by manual effort. This is satisfactory for small work but it is sometimes desirable to have the torch carriage propelled by power. A modification permitting this has been shown in Figs. 11 and 12. In this case the rolls at the end of the shafts 27 are indicated at 50 and are preferably freely rotatable on the shafts. The shafts carry gears 51 in mesh with racks 52 cut into the channel members 15 or racks 53 in the channel members 20. The shafts 27 of at least one set are splined together as at 54 so that the gears will exert equal traction on both sides of the carriage. A separate gear 55 on one of the shafts 27 meshes with a wide gear 56 on a driven shaft 57. In using this type of construction, the channel sections 20 can be adjusted longitudinally of the tracks 15 only in multiples of the pitch of the racks which are employed; but this is generally close enough for ordinary purposes. In this case, as in the one already described, the shafts in the carriage are moved toward each other, compressing the springs 27 as the carriage passes from the main track to the adjustable track section.

In order to relieve any end pressure which might otherwise be exerted on the gears 52, the rolls 50 are preferably made of larger diameter than the gears and strike on their sides against the edges 58 of the channel sections. The force causing compression of the springs 57 will thus be transmitted through the rollers and not through the gears. Power may be applied to the shaft 57 by a small motor mounted upon the carriage or by means of a flexible shaft from some external source.

While the device has been described in an example particularly adapted for cutting I-beams, it will be understood that it is also adaptable for other forms of material, structural steel or otherwise.

What I claim is:

1. A cutting device comprising a trackway passing around three sides of a structural steel member comprising re-entrant parts, a torch carriage movable in the trackway to carry a torch around the external boundaries of the member, and a torch shiftably mounted in the carriage so that it may be moved substantially parallel with and adjacent the re-entrant parts of the member.

2. A cutting device comprising a trackway adjustable in length and passing around three sides of a structural steel member comprising re-entrant parts, a carriage movable in the trackway to carry a torch around the external boundaries of the member, a torch shiftably mounted in the carriage so that it may be moved substantially parallel with and adjacent the re-entrant parts of the member, and adjustable stops limiting the motion of the torch towards said re-entrant parts.

3. A cutting device comprising a trackway adjustable in length and passing around three sides of a structural steel member comprising re-entrant parts, a carriage movable in the trackway to carry a torch around the external boundaries of the member, a torch shiftably mounted in the carriage so that it may be moved substantially parallel with and adjacent the re-entrant parts of the member, a spring normally holding the torch at its limit of motion away from the member, and adjustable stops limiting the motion of the torch towards said re-entrant parts.

4. A cutting device comprising channeled tracks having opposed straight runs and angular portions, a pair of shiftable channeled tracks extending angularly from the straight run of the tracks and having tongues fitting into the channels in said straight runs, said shiftable tracks having the bottoms of their channels merging into the bottoms of the channels of the straight runs, a carriage having supporting members which are slidable in the channels and contractible transversely so as to pass from the straight runs to said shiftable tracks, and a torch mounted in the carriage.

5. A cutting device comprising channeled tracks having opposed straight runs and angular portions, a pair of shiftable channeled tracks extending angularly from the straight run of the tracks and having tongues fitting into the channels in said straight runs, said shiftable tracks having the bottoms of their channels merging into the bottoms of the channels of the straight runs, a carriage having supporting members which are slidable in the channels and contractible transversely so as to pass from the straight runs to said shiftable tracks, a torch movably mounted in the carriage, and abutments limiting the travel of the torch in the carriage.

6. A cutting device comprising channeled tracks having opposed straight runs and angular portions, a pair of shiftable channeled tracks extending angularly from the straight run of the tracks and having tongues fitting into the channels in said straight runs, said shiftable tracks having the bottoms of their channels merging into the bottoms of the channels of the straight runs, means for securing the shiftable tracks to the straight tracks in any desired position of adjustment, a carriage having supporting members which are slidable in the channels and contractible transversely so as to pass from the straight runs to said shiftable tracks, a torch movably mounted on the carriage, a spring normally holding the torch in its outer position, and adjustable abutments for limiting the motion of the torch towards the work.

7. A cutting device comprising a trackway passing around three sides of a structural steel member comprising re-entrant parts, a torch carriage movable in the trackway to carry a torch around the external boundaries of the member, a torch shiftably mounted in the carriage so that it may be moved substantially parallel with and adjacent the re-entrant parts of the member, and means for propelling the carriage along the trackway.

8. A cutting device comprising channeled tracks having opposed straight runs and angular portions, a pair of shiftable channeled tracks extending angularly from the straight run of the tracks and having tongues fitting into the channels in said straight runs, said shiftable tracks having the bottoms of their channels merging into the bottoms of the channels of the straight runs, a carriage having supporting members which are slidable in the channels and contractible transversely so as to pass from the straight runs to said shiftable tracks, a torch mounted in the carriage, and means for propelling the carriage along the trackway.

9. A cutting device comprising channeled tracks having opposed straight runs and angular portions, a pair of shiftable channeled tracks extending angularly from the straight run of the tracks and having tongues fitting into the channels in said straight runs, said shiftable tracks having the bottoms of their channels merging into the bottoms of the channels of the straight runs, a carriage having supporting members which are slidable in the channels and contractible transversely so as to pass from the straight runs to said shiftable tracks, a torch mounted on the carriage, racks adjacent said tracks, and gears mounted on the carriage and rotatable to propel the carriage along the trackway.

10. A cutting device comprising a pair of main opposed channeled tracks bent at one end to form angular portions joined by a curve with their straight portions, a pair of channeled tracks slidable along the straight portions of the main tracks and having angularly extending portions joined by a curve with said straight portions, said slidable tracks having tongue portions extending into the channels of the main tracks and beveled to form inclined planes leading from the channels of the main tracks to the channels of the slidable tracks, a carriage having rotatable and yieldable rolls received in and guided by the channels of the main tracks, said rolls yielding towards each other as the carriage passes from the main track to the slidable track, a torch yieldingly mounted on the carriage, and a rotatable stepped abutment adjustably limiting the travel of the torch in one direction.

11. A cutting device comprising a pair of main opposed channeled tracks bent at one end to form angular portions joined by a curve with their straight portions, a pair of channeled tracks slidable along the straight portions of the main tracks and having angularly extending portions joined by a curve with said straight portions, said slidable tracks having tongue portions extending into the channels of the main tracks and beveled to form an inclined plane leading from the channels of the main tracks to the channels of the slidable tracks, said main and slidable tracks being provided with racks, a carriage having rotatable and yieldable rolls received in and guided by the channels of the main tracks, gears associated with at least some of the rolls and meshing with the racks on the trackway, said rolls and gears yielding towards each other as the carriage passes from the main track to the slidable track, a torch yieldingly mounted on the carriage, a rotatable stepped abutment adjustably limiting the travel of the torch in one direction, and means for rotating the gears to cause travel of the torch carriage along the tracks.

In testimony whereof I have affixed my signature.

WAYNE F. PALMER.